Patented May 9, 1939

2,157,190

UNITED STATES PATENT OFFICE 2,157,190

ARTIFICIAL MATERIAL AND METHOD OF MAKING SAME

George W. Seymour, Cumberland, Md., assignor to Celanese Corporation of America, a corporation of Delaware No Drawing. Application November 23, 1934, Serial No. 754,472

2 Claims. (Cl. 260—13)

This invention relates to the production of artificial materials such as filaments, films, foils, sheets, lacquers, etc. that contain an organic derivative of cellulose and more particularly to such materials which contain besides the organic derivative of cellulose a material that lends flexibility and elasticity thereto without materially softening same.

An object of the invention is the economic and expeditious production of artificial materials that contain organic derivatives of cellulose that are flexible and pliable yet which are not softened appreciably by the material that, incorporated therewith, produces these desired qualities. Other objects of the invention will appear from the following detailed description.

In employing my invention, I add to or incorporate with the organic derivative of cellulose a reaction product of a vegetable oil and a compound containing an aldehyde radical. In this manner I am able to produce hard filaments, films, foils, etc. that are pliable and elastic yet which retain their original transparency. Thus, by employing this invention tougher films and filaments may be produced than was heretofore possible.

Filaments produced according to this invention are pliable and may be circular knitted into fabric of exceedingly fine stitch shape without breaking since the filaments are rendered amenable to the back and forth bending through sharp angles occurring during the knitting operation.

Films and foils produced according to this invention may be hard yet pliable and are not made less transparent by reason of the incorporated material that produces these qualities. Further, the added material or modifying material is compatible with the solution from which the filaments, films, foils, etc. are formed. Solutions, therefore, may be made that are stable and capable of storage and handling, as solutions, without the precipitation of one or the other of the components.

This invention is also directed to the compounds that impart to filaments, films, foils, etc. of organic derivatives of cellulose pliability and flexibility without materially reducing the hardness of the material or reducing its transparency. These compounds are the reaction products of oxidized vegetable oils with aldehydes.

In accordance with my invention, I react a compound containing at least one aldehyde radical with a vegetable oil, oxidized vegetable oil or a mixture of these. The resulting product, for the purpose of description and the claims, is termed "formal of vegetable oil." Further in accordance with my invention, I add to or incorporate with materials containing organic derivatives of cellulose from less than 1 to 20% or more, based on the weight of the organic derivative of cellulose, of a formal of vegetable oil. The incorporation of the formal of vegetable oil with the organic derivatives of cellulose is preferably accomplished while the organic derivative of cellulose is dissolved in a volatile solvent which is relatively free from water.

Any suitable oil may be employed as one of the reactants in forming the formal of vegetable oil. Although it is preferable to employ oxidized castor oil, with particular reference to which this invention will be described, other oils may be employed, for instance, castor oil, soya bean oil, olive oil, teaseed oil and other non-drying or semi-drying oils that contain at least some constituents containing a hydroxyl group, and also such oils which after they have been oxidized contain a hydroxyl group. The oil material is reacted with a compound containing at least one aldehyde radical, for instance, formaldehyde, paraldehyde, metaldehyde, acetaldehyde, crotonic aldehyde, etc.

The reaction between the oil and the aldehyde may be carried out by refluxing the two materials together in the presence of a catalyst, for example, phosphoric acid. The proportion of aldehyde, calculated as formaldehyde, to oil may be from less than 1 to more than 3 times the theoretical amount to form the diether of the aldehyde radical with the hydroxyl radicals of the oil, assuming the oil to be the pure glyceride of a fatty acid. In employing oxidized castor oil and formaldehyde, the preferable portion may be 100 parts of oil by weight to 30 parts of formaldehyde by weight. The refluxing may be carried out at from less than 100° C. to over 130° C. and for a length of time to complete the reaction, which may be from 4 to 10 hours. By this process substantially all the aldehyde compound enters the reaction leaving but a trace of unreacted aldehyde.

In the preparation of a formal of a vegetable oil, employing castor oil, for instance, the procedure may consist in refluxing the castor oil in the presence of a catalyst with more than 3 times the theoretical amount of paraform to form the diether by reaction between the aldehyde radicals and the OH radicals of the oil, assuming the oil to be the pure glycerol triricinoleate, washing with cold water to remove the catalyst, then with hot water to remove the residual trace of paraform and finally drying the oil in the presence of ethyl alcohol. The product may be subjected to steam distillation prior to treatment with alcohol. The resulting product is an oily appearing substance, usually brown in color, having an increased viscosity over the starting oil. The product may have a very marked sweet aromatic odor. The product is compatible with solutions of organic derivatives of cellulose, especially when the solution of the organic derivative of cellulose is comparatively free from water.

As an illustration and not as a limitation, the following example of producing the formal of vegetable oil is given.

*Example I*

| | Parts by weight |
|---|---|
| Oxidized castor oil | 100 |
| Paraform aldehyde (3 aldehyde radicals) | 30 |
| Phosphoric acid | 0.2 | are refluxed for about 8 hours at from 100° to 120° C. The product is then steam distilled for about 8 hours, washed with cold water to remove phosphoric acid and then dried in the presence of either ethyl or methyl alcohol. The product is a clear brown liquid having a sweet aromatic odor.

The formal of vegetable oil may be incorporated with organic derivatives of cellulose in amounts of up to and over 20% of the weight of the organic derivative of cellulose. This results in films and filaments possessing a marked flexibility which is not ordinarily attained in like articles of an equal degree of hardness. Any suitable organic derivative of cellulose may be employed as the base material such as the organic esters of cellulose and the cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

The organic derivatives of cellulose may be dissolved in any suitable solvent, and especially a solvent containing no water. For instance, in employing cellulose acetate, there may be used a mixture of equal parts of acetone and methylene ether of ethylene glycol as the solvent. Other solvents may be employed, for example, a mixture of acetone and ethyl or methyl alcohol, ethylene dichloride, a mixture of ethylene dichloride and ethyl or methyl alcohol, and like solvents. When making filaments, films, foils, etc. from such solution there may be added, besides the formal of vegetable oil, any desired modifying agent by which term is meant an agent that modifies the lustre, hardness, color, etc. of the resulting filament, foil, film, etc. Examples of modifying agents are pigments, filling materials, dyes or lakes, fire retardants, plasticizers, sizes and lubricants.

Filaments may be formed from the solutions containing the organic derivative of cellulose and formal of vegetable oil by any suitable method. Thus, when employing cellulose acetate a solution may be formed of about 1 part of cellulose acetate, 4 parts of solvent and 0.2 part of formal of vegetable oil, and the same extruded through suitable orifices into a solvent removal medium, such as an evaporative atmosphere in the dry method of spinning, or a precipitating bath in the wet method of spinning. Any suitable method of spinning may be employed, many of which are well known in the art. Any amount of formal of vegetable oil may be employed preferably from less than 1 to about 20%, when clear, tough films are desired. A similar solution with or without the addition of modifying agents may be cast on a surface such as a film casting wheel and the solvent removed to form films or foils. Further, sheets may be formed of the mixture of organic derivative of cellulose and formal of vegetable oil by block pressing methods, i. e. a large block or rod formed by pressing the plastic material in the presence of heat is cut into sheets by a planer or lathe type of sheet cutting device.

As an illustration and not as a limitation the following example of forming films is given:

*Example II*

A solution or mixture is formed by mixing together

| | Parts by weight |
|---|---|
| Acetone | 5 |
| Methylene ether of ethylene glycol | 5 |
| Cellulose acetate | 2.5 |
| Formal of castor oil | 0.5 |

The mixture is then flowed upon a polished surface such as a film casting wheel and the volatile material removed, after which it is stripped from the wheel. The film is clear and tough with a marked degree of flexibility for its hardness.

In place of adding the formal of vegetable oil to the solution from which films and filaments are formed, the formal of vegetable oil may be incorporated with formed films or filaments by coating same with the formal of vegetable oil in the presence of a swelling agent for the base material of the film or filament. Further, the formal of vegetable oil may be mixed with untreated or oxidized oil to form a lubricant for filaments.

It is to be understood that the foregoing detailed description is merely given by way of illustration, and many alterations may be made therein without departing from the spirit of my invention.

Having described my invention, what I desire to secure by Letters Patent is:

1. A composition of matter comprising cellulose acetate and from 2 to 10%, based on the weight of the cellulose acetate present, of the reaction product of 100 parts by weight of oxidized castor oil and 30 parts by weight of paraformaldehyde.

2. Filaments, films and other artificial materials comprising cellulose acetate and from 2 to 10%, based on the weight of the cellulose acetate present, of the reaction product of 100 parts by weight of oxidized castor oil and 30 parts by weight of paraformaldehyde.

GEORGE W. SEYMOUR.